Aug. 28, 1934. T. W. BACCHUS Re. 19,288
METHOD OF TREATING FIBROUS MATERIALS
Original Filed Sept. 23, 1930
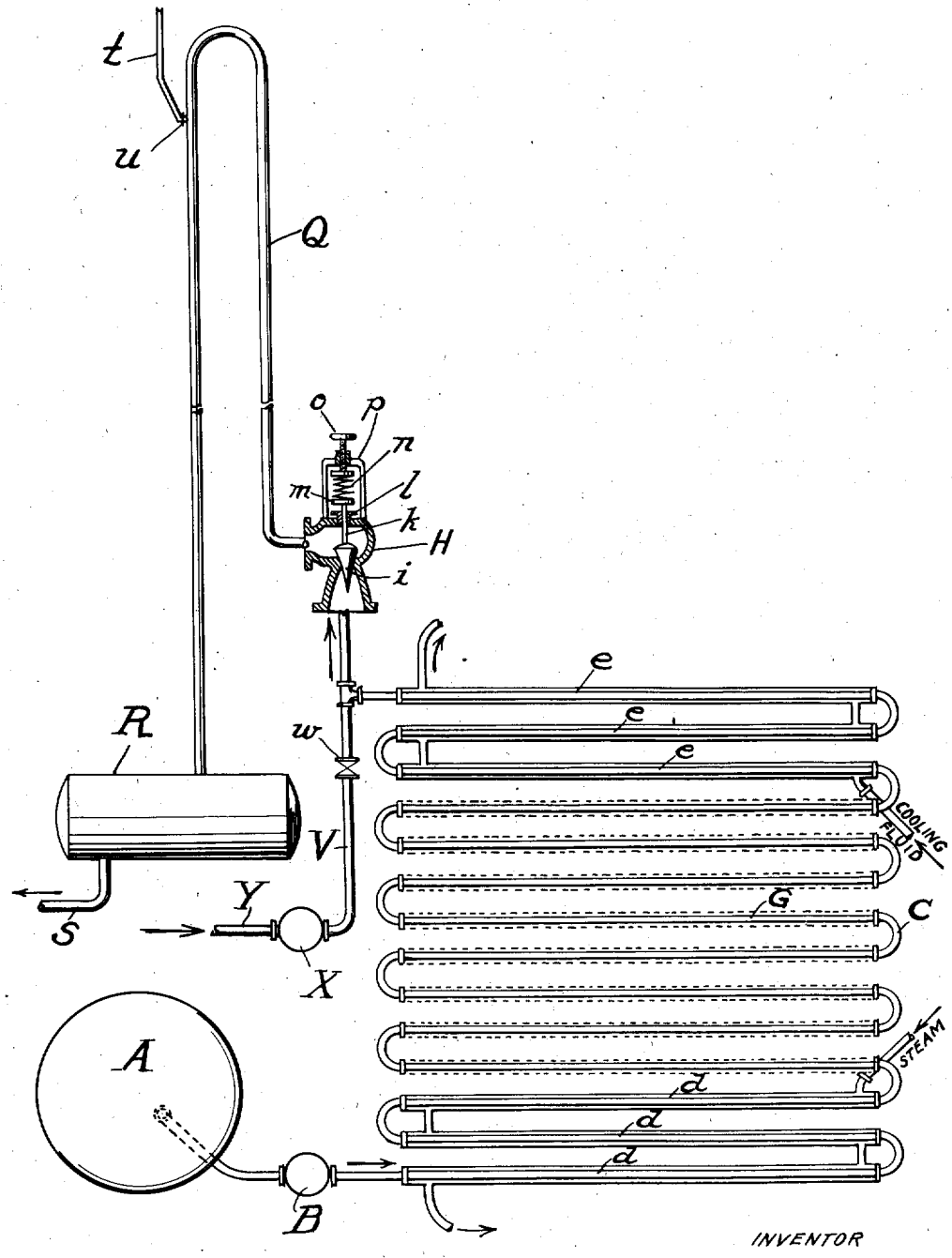
INVENTOR
WITNESS:
Robt. R. Kitchel
Thomas W. Bacchus
BY
Busser & Harding
ATTORNEYS.

Reissued Aug. 28, 1934

Re. 19,288

UNITED STATES PATENT OFFICE 19,288

METHOD OF TREATING FIBROUS MATERIALS

Thomas W. Bacchus, Wilmington, Del., assignor to Hercules Powder Company, Wilmington, Del., a corporation of Delaware Original No. 1,856,453, dated May 3, 1932, Serial No. 483,835, September 23, 1930. Application for reissue May 22, 1934, Serial No. 727,000

9 Claims. (Cl. 92—7)

My invention relates to a method for treating fibrous materials, as for example, cotton linters, straw, wood, or the like.

In the preparation of fibrous materials for various purposes, it is desired to effect removal from the materials of hull particles or lignous impurities, to effect saponification of the oils and emulsification of the waxes, etc., and for certain purposes, as in the preparation of cellulose materials for nitration, it is desirable to effect reduction in the viscosity of such materials.

Heretofore in the treatment of fibrous materials, it has been generally customary to place the materials in large kiers or digesters together with an aqueous caustic soda solution of suitable concentration, or with sulphate liquor, or other purifying solution, and the contents heated, either directly or indirectly, under a pressure between about atmospheric and 150 pounds, depending upon the result desired to be obtained. The treatment in the kiers or digesters has heretofore been continued for from 1 to 18 hours or more. At the end of the period of treatement the pressure is released from the kiers or digesters, the liquor drained from the material and the material washed, bleached, dried, etc. as desired.

As an example of the treatment of fibrous materials by methods heretofore known, dry cotton linters are placed in a kier or digester with, for example, a 1%–4% sodium hydroxide solution in, for example, the ratio of 6 parts of sodium hydroxide solution to 1 part cotton linters. Steam is applied to the kier or digester at a pressure of, for example, 60 pounds and maintained for a period of, for example, 5 hours, after which the pressure is released, the liquor drained off and the treated linters washed with water, subjected to treatment with a suitable bleaching agent and finally dried.

The method heretofore used in the treatment of fibrous materials, as above briefly outlined, is disadvantageous for many reasons, chief among which are that it involves batch operation, requires large and expensive apparatus, which in operation presents various problems of control, is expensive to maintain, and, at the same time, is capable of only a limited output.

Now, in accordance with my invention, I have discovered that the desired treatment for the purification of fibrous materials and desired reduction in viscosity may be effected in a continuous manner by continuously passing the material to be treated in admixture with a desired solution for effecting the treatment, through a zone wherein the fibrous material is subjected to the action of heat and pressure, the discharge from such a zone being controlled.

In the practical adaptation of the method in accordance with my invention, for example, the fibrous material, as cotton linters, straw, comminuted wood, or the like, to be purified, in admixture with a purifying solution may be pumped through a passage, the discharge from which is controlled and in which the mixture of fibrous material and purifying solution is subjected to heat at the desired temperature and maintained under the desired pressure. The temperature will desirably be substantially above the boiling point of the treating solution, i. e. substantially above, and preferably will be above about 140° C.

As a more specific illustration of the practical adaptation of my invention, cotton linters, straw, comminuted wood or the like, may be mixed in a suitable container with a purifying solution, such as a solution of sodium hydroxide, sulphate liquor solution, etc. The mixture may be pumped from the container through a coil of tubing, the outlet from which is suitably controlled as, for example, by providing a suitable valve, connecting with a standpipe, or otherwise providing for control of the outlet.

Having now indicated in a general way the nature and purpose of my invention, I will more specifically describe a preferred practical adaptation thereof by way of illustration in connection with, for example, the purification of cotton linters and with reference to the accompanying drawing by which is illustrated diagrammatically a form of apparatus adaptable for the carrying out of the method embodying my invention.

Referring to the drawing, A indicates a container desirably fitted with some form of agitating device in which the material to be treated may be mixed with a treating solution. B indicates a pump, the suction side of which is connected with the container A and the discharge side of which is connected to the inlet end of a coil of pipe C. A portion of the coil of pipe C adjacent to the discharge of the pump B is jacketed as shown at *d*, the jackets being connected and provided with an inlet and discharge for steam. The coil adjacent its discharge end is jacketed as shown at *e*, the jackets being connected and provided with an inlet and discharge for cooling water. The portion of the coil intermediate the jackets *d*, *e*, is covered with insulating material, as for example, asbestos, or the like, as indicated at G.

The discharge or outlet end of the coil C is connected to a valve casing H, within which is provided a valve seat on which is adapted to seat a conoidal shaped valve *i* provided with a stem *k* extending through a stuffing box *l* in the casing, and provided at its outer end with a head *m* against which abuts one end of a spring *n*, the other end of which abuts against an adjustable stop *o* carried by a bracket *p* attached to the casing. The valve casing H is desirably connected to a standpipe Q, which extends upward for a substantial distance and returns to connection with a surge tank or receiving tank R from which a discharge S is provided. Adjacent the upper portion of the stand pipe Q a vent *t*, provided with a suitable valve *u*, is provided. If desired the standpipe Q may be omitted and the valve casing connected directly to the surge tank R, or the valve *i* may be omitted and the coil C connected directly to standpipe Q.

Connected to the discharge or outlet end of the coil C, or connected to the coil adjacent the discharge or outlet end, is a pipe V provided with a suitable valve *w*. Pipe V is connected to the discharge side of a pump X, the inlet side, through a pipe Y, being connected with a suitable source of purifying solution or of water.

In carrying out the method in accordance with my invention, in the apparatus above described, for example, cotton linters are placed in the container A together with an aqueous caustic soda solution of .5%-2% strength, in the proportion of say 1 part of cotton linters to 50 parts of caustic soda solution by weight. The mixture of cotton linters and caustic liquor is then pumped by the pump B through the coil C at a velocity of say about 2 feet per second. The mixture of cotton linters and caustic solution are brought to a suitable temperature, say about 165° C. by the introduction of steam into the jackets *d* or, if desired, live steam may be injected into the coil at a suitable point or points to obtain the desired temperature. The temperature of the mixture of cotton linters and caustic solution is maintained at approximately 165° C. in its travel through that part of the coil which is insulated, and is suitably reduced to a point below the boiling point of the caustic solution before discharge from the coil through the introduction of cooling water into the jackets *e*. The mixture is desirably maintained under a pressure of about 200 lbs. per square inch in its passage through the coil, by adjustment of valve *i*.

In the treatment of cotton linters as indicated above, the section of the coil provided with steam jackets *d* may be of any suitable length to obtain the desired temperature and the portion of coil provided with cooling jackets *e* may be of any desired length to obtain the desired cooling. The insulated section of the coil in which the desired temperature is maintained will desirably be about three thousand feed long.

Discharge of the mixture of cotton linters and caustic solution from the coil C is controlled by the valve *i*, which, it will be noted, is so mounted that should cotton jam in the valve and tend to back up in the coil, the valve *i* may open and relieve any jam. Thus, the valve will tend to uniformly control discharge from and hence equalize the pressure on the coil C. The mixture of cotton linters and caustic solution discharged from the coil C will, after passing through the valve, pass up standpipe Q and down into tank R. The standpipe Q may be made of any desired height, its purpose being primarily to cooperate with the valve *i* in controlling the discharge from and equalize the pressure on the coil C. Under certain circumstances the control of the discharge from the coil C may be effected by connecting the discharge directly with the standpipe Q, the valve *i* being omitted. In such case the standpipe Q would be made of sufficient height so that desired control of the discharge from the coil would be effected through the pressure of the column of cotton linters and solution in the standpipe. It will be noted that the standpipe is provided with a vent controlled by a suitable valve in order to prevent or control the creation of a vacuum by the downwardly passing cotton linters and solution upon the column communicating with the coil.

During the passage of cotton linters and solution through the coil C spent caustic soda solution or water is desirably pumped by pump X through the pipe V and passes with the cotton linters and solution discharged from the coil through the valve *i*. The spent caustic soda solution or water supplied by pump X acts to increase the ratio of caustic soda solution to cotton over that of the mixture discharged from the coil with the result that the mixture will more readily pass through the valve *i*.

The cotton linters discharged into tank R may be drawn therefrom as desired for separation from the purifying solution, washing and subjecting to such other treatment as may be desired.

The product withdrawn from tank R, as for example, cotton linters, straw, comminuted wood, or the like, which may have been treated, will be found to have great purity, to be free from waxes, oils and from hulls and encrusting materials and to be of a desired reduced viscosity. The product will be obtained with great reduction of time, labor, and with very simple apparatus.

It will be appreciated that in the carrying out of my invention the precise temperature and pressure used and the time of treatment will depend upon the material treated and the desired characteristics of purity, reduced viscosity, softness, etc. desired. It will be appreciated that the time of treatment may be readily varied for the treatment of any particular material and for the production of any particular grade of product by a regulation of the velocity at which the material is passed through the zone of treatment or coil and the extent of the zone or coil.

It will be appreciated that the method in accordance with my invention is not dependent upon the use of any particular form of apparatus and that that described herein is disclosed merely for purposes of illustration. It will be further appreciated that in carrying out the method in accordance with my invention various modifications may be made without departing from my invention.

What I claim and desire to protect by Letters Patent is:

1. The method of treating fibrous material which includes forcing a mixture of fibrous material and a treating solution under pressure through a passage, heating the mixture adjacent the inlet end of said passage, cooling the mixture adjacent the discharge end of said passage and controlling the discharge from said passage.

2. The method of treating cotton linters which includes forcing a mixture of cotton linters and a caustic soda solution under pressure through a passage, heating the mixture at a point within said passage, cooling the mixture adjacent the discharge end of said passage and controlling the discharge from said passage.

3. The method of treating fibrous cellulosic material which includes forcing a mixture of fibrous cellulosic material and an alkaline treating solution through a passage, heating the mixture within the passage to a temperature substantially above the boiling point of the treating solution at atmospheric pressure, cooling the mixture adjacent the discharge end of said passage to a temperature below the boiling point of the treating solution and controlling the discharge from said passage.

4. The method of treating fibrous cellulosic material which includes forcing a mixture of fibrous cellulosic material and an alkaline treating solution comprising an aqueous solution of caustic soda, through a passage, heating the mixture within the passage to a temperature higher than about 140° C., cooling the mixture adjacent the discharge end of said passage to a temperature below the boiling point at atmospheric pressure of the treating solution and controlling the discharge from said passage.

5. The method of treating cotton linters which includes forcing a mixture of cotton linters and a treating solution comprising an aqueous solution of caustic soda, through a passage, heating the mixture within the passage to a temperature substantially above the boiling point of the treating solution at atmospheric pressure, cooling the mixture adjacent the discharge end of said passage to a temperature below the boiling point of the treating solution and controlling the discharge from said passage.

6. The method of treating cotton linters which includes forcing a mixture of cotton linters and a treating solution comprising an aqueous solution containing about 0.5–2% sodium hydroxide by weight, through a passage, heating the mixture within the passage to a temperature substantially above the boiling point of the treating solution at atmospheric pressure, cooling the mixture adjacent the discharge end of said passage to a temperature below the boiling point of the treating solution and controlling the discharge from said passage.

7. The method of treating fibrous cellulosic material which includes forcing a mixture of fibrous cellulosic material and a treating solution comprising an aqueous solution containing about 0.5–2% sodium hydroxide by weight through a passage, heating the mixture within the passage to a temperature of about 165° C., cooling the mixture adjacent the discharge end of said passage to a temperature below the boiling point of the treating solution at atmospheric pressure and controlling the discharge from the passage.

8. The method of treating fibrous cellulosic material which includes forcing a mixture of fibrous cellulosic material and a treating solution through a passage, introducing steam into the passage to heat the mixture to a temperature substantially above the boiling point of the treating solution, cooling the mixture adjacent to the discharge end of the passage to a temperature below the boiling point of the treating solution at atmospheric pressure and controlling the discharge from the passage.

9. The method of treating cotton linters which includes forcing a mixture of cotton linters and a treating solution comprising an aqueous solution containing about 0.5–2% by weight of sodium hydroxide through a passage, introducing steam into the passage to effect heating of the mixture to a temperature higher than about 140° C., cooling the mixture adjacent the discharge end of the passage to a temperature below the boiling point of the treating solution at atmospheric pressure and controlling the discharge from the passage.

THOMAS W. BACCHUS.